3,773,790
SPIROACETAL DIAMINE-EPOXIDE LIQUID AS CURING AGENT FOR EPOXY RESINS
Ippei Yoshimura, Tokyo, Norihiko Fukue and Hiroshi Sakamoto, Kawasaki, Hisashi Murofushi, Tokyo, and Takami Hiyama and Takao Matsunaga, Yokohama, Japan, assignors to Ajinomoto Co., Inc., Tokyo, Japan
No Drawing. Continuation-in-part of application Ser. No. 880,356, Nov. 26, 1969, now Patent No. 3,679,707, which is a continuation-in-part of abandoned application Ser. No. 560,067, June 24, 1966. This application June 20, 1972, Ser. No. 264,621
Int. Cl. C07d 15/04
U.S. Cl. 260—340.7                                  6 Claims

ABSTRACT OF THE DISCLOSURE

Epoxides react with spiroacetal diamines of the formula $$\text{H}_2\text{N}-\text{R}'\underset{\underset{\text{O}-\text{CH}_2}{|}}{\overset{\overset{\text{R}}{|}}{\underset{|}{\text{C}}}}\underset{\underset{\text{CH}_2-\text{O}}{|}}{\overset{\overset{\text{O}-\text{CH}_2}{|}}{\underset{|}{\text{C}}}}\underset{\underset{\text{CH}_2-\text{O}}{|}}{\overset{\overset{\text{R}}{|}}{\underset{|}{\text{C}}}}\text{R}'-\text{NH}_2$$

to form a viscous liquid which is a good hardener for epoxy resin intermediates, in the formula R being hydrogen, methyl, or ethyl, and R′ being alkyl having 1 to 6 carbon atoms. Epoxy resins cured by means of the hardener are flexible, colorless and transparent.

---

This application is a continuation-in-part of our copending application Ser. No. 880,356, filed on Nov. 26, 1969, now Pat. No. 3,679,707, and itself a continuation-in-part of our application, Ser. No. 560,067, filed June 24, 1966, and now abandoned.

This invention relates to epoxy resin compositions, and particularly to curing agents effective for curing such compositions at room temperature.

Polyamines, acid anhydrides, polyamides and polysulfides have been used commercially heretofore as curing agents in epoxy resin compositions. The flexibility often required of the cured epoxy resins in coatings, adhesives and castings could be achieved by the use of polyamide and polysulfide curing agents, but only at the cost of reduced tensile and flexural strength in the cured resins. Moreover, full curing by means of these agents could be achieved only at elevated temperature. The cured resins lack full transparency and are not colorless.

We now have found that epoxy resin intermediates can be cured completely at room temperature to colorless and transparent resins having excellent flexibility without loss of mechanical strength by the use of certain modified spiroacetal diamines as curing agents. The curing agents of the invention are reaction products of epoxides with a spiroacetal diamine of the formula $$\text{H}_2\text{N}-\text{R}'\underset{\underset{\text{O}-\text{CH}_2}{|}}{\overset{\overset{\text{R}}{|}}{\underset{|}{\text{C}}}}\underset{\underset{\text{CH}_2-\text{O}}{|}}{\overset{\overset{\text{O}-\text{CH}_2}{|}}{\underset{|}{\text{C}}}}\underset{\underset{\text{CH}_2-\text{O}}{|}}{\overset{\overset{\text{R}}{|}}{\underset{|}{\text{C}}}}\text{R}'-\text{NH}_2$$

wherein R is hydrogen, methyl or ethyl, and R′ is straight or branched-chain alkyl having 1 to 6 carbon atoms.

The curing agents of the invention are stable and do not discolor in storage, during curing or after curing. They produce hard, tough, substantially colorless and transparent cured resins from all epoxy resin intermediates in present commercial use or otherwise available to us.

Spiroacetal diamine compounds of the above formula which have been used successfully for preparing the curing agents of the present invention include 3,9-bis(aminoethyl)-2,4,8,10-tetraoxaspiro[5,5]undecane,
3,9-bis(2-aminoethyl)-2,4,8,10-tetraoxaspiro[5,5]undecane,
3,9-diethyl-3,9-bis(2-aminoethyl)-2,4,8,10-tetraoxaspiro-[5,5]undecane,
3,9-bis(3-aminopropyl)-2,4,8,10-tetraoxaspiro[5,5]undecane,
3,9-bis(4-aminobutyl)-2,4,8,10-tetraoxaspiro[5,5]undecane,
3,9-bis(1,1-dimethyl-4-aminobutyl)-2,4,8,10-tetraoxaspiro[5,5]undecane.

The spiroacetal diamine compounds may be prepared by the methods disclosed in the German Pat. No. 1,092,029 or the U.S. Pat. No. 2,996,517 wherein formyl nitrile and pentaerythritol are reacted in the presence of an acid catalyst, and the formed intermediate 3,9-bis(cyanoalkyl)-2,4,8,10-tetraoxaspiro[5,5]undecane is subjected to catalytic hydrogenation. They may also be prepared by reacting an aminoaldehyde acetal with pentaerythritol in the presence of an acid catalyst.

The curing agents of the invention are prepared by heating a mixture of the spiroacetal diamine with an epoxide with or without a solvent inert to the reactants. Suitable solvents include methanol, ethanol, butanol, benzene, toluene, xylene, dioxane, ethyleneglycol monomethyl ether, ethyleneglycol monoethyl ether and the like. Heating is continued until a homogeneous viscous liquid is obtained after removal of the solvent, if any. The reaction temperature is preferably above the melting point of the diamine and below the boiling point of the epoxide so that the mixture is liquid. Temperatures between 20° C. and 150° C. are usually satisfactory, and the time required varies inversely with the temperature.

It is preferred to use more than 0.25 mole of spiroacetal diamine per oxirane mole equivalent of the epoxide in the reaction mixture, but as much as 10 moles of spiroacetal diamine may be employed. A curing agent prepared with less than 0.25 mole spiroacetal diamine per oxirane mole equivalent of the epoxide does not completely cure an epoxy resin because of inadequate cross-linking, and the partly cured resin has poor chemical and mechanical properties. When more than 10 moles of spiroacetal diamine are employed in preparing the curing agent per oxirane mole equivalent, the diamine, which remains partly unreacted, crystallizes sooner or later and impairs the workability of the cured plastic.

The reaction between a spiroacetal diamine and an epoxide having one oxirane group produces a reaction mixture in which several of the compounds listed below can be found, the prevailing compound or compounds being determined mainly by the initial ratio of spiroacetal diamine $\text{NH}_2$—X—$\text{NH}_2$ and epoxide $$\text{Y}-\text{CH}-\text{CH}_2\diagdown\!\!\!\diagup\text{O}$$

wherein X is spiroacetal and Y any of various radicals attached to the oxirane group:

$\text{NH}_2$—X—$\text{NH}_2$ (unreacted spiroacetal diamine)
$\text{NH}_2$—X—NH—$\text{CH}_2$—CHOH—Y
$\text{NH}_2$—X—N=($\text{CH}_2$—CHOH—Y)$_2$
Y—CHOH—$\text{CH}_2$—NH—X—NH—$\text{CH}_2$—CHOH—Y
Y—CHOH—$\text{CH}_2$—NH—X—N=($\text{CH}_2$—CHOH—Y)$_2$
(Y—CHOH—$\text{CH}_2$)$_2$=N—X—N=($\text{CH}_2$—CHOH—Y)$_2$ More complex mixtures are obtained by the use of epoxides having more than one oxirane group. Even reaction mixtures prepared from equimolecular amounts of spiroacetal diamine and epoxide do not yield a single condensation product, but a mixture of reaction products which is a viscous liquid at ordinary temperature (20° C.), a fact believed to be essential for the beneficial effects of the curing agents of the invention. The various curing agents of the invention referred to hereinbelow have viscosities of approximately 1000 to 500,000 centipoise at 20±1° C. when determined by means of a viscosimeter of the Brookfield type.

The reaction product may be subjected to fractional distillation to remove solvent or an excess of spiroacetal diamine if present, but small amounts of solvent or unreacted diamine do not normally interfere with the normal curing action, and need not be removed.

Best results are generally obtained with curing agents prepared from 0.5 to 6.0 mole spiroacetal diamine per oxirane mole equivalent of epoxide.

The curing agents of the invention are colorless and transparent. They do not irritate the skin upon contact. No discoloration of the curing agents has been observed in three months of storage at room temperature. Storage for more than two months at temperatures below 5° C. did not cause unreacted spiroacetal diamine to crystallize nor otherwise to precipitate.

Representative epoxy resin intermediates capable of being cured by the curing agents of this invention are those based on the glycidyl ethers, of polyhydric phenols, such as 2,2-bis(4-hydroxyphenyl)-propane, resorcinol, hydroquinone, pyrocatechol, saligenin, 4,4-diphenylhydroxybiphenyl, 1,5-dihydroxynaphthalene, dihydroxydiphenylmethane, dihydroxydiphenylsulfone, and on the glycidyl ethers of polyhydric alcohols, such as ethylene glycol, propylene glycol and glycerin.

The required amount of curing agent is determined by the number of active hydrogen atoms in the curing agent employed, and the number of oxirane groups in the epoxy resin intermediate. In general, it is preferred to use equivalent weights of spiroacetal diamine condensates and epoxy resin intermediates. However, the properties of the cured resin are not significantly affected by variations of not more than 20% in the amount of the curing agent.

The epoxy resins cured according to this invention are superior to resins produced from the same intermediates by means of conventional curing agents by a combination of better flexural properties, higher impact resistance, and better thermal shock resistance with equal or superior tensile strength and hardness.

The epoxy resin intermediates can be cured completely at room temperature to colorless and transparent resins having excellent mechanical properties. Heating is unnecessary, but may be resorted to for obtaining maximum strength in a shorter time. Even when cured at elevated temperature, the cured resins are not stained by the curing agents of this invention.

The curing agents are compatible with all conventional fillers, diluents, reinforcing agents, pigments and other processing agents, such as flow control additives and accelerators, so that resin compositions may be formulated according to the intended application in the usual manner.

The following examples further illustrate the present invention, but it will be understood that the invention is not limited thereto.

EXAMPLE 1

In a four-necked flask equipped with a stirrer, a reflux condenser, a dropping funnel and a thermometer, 109.6 g. (0.4 mole) 3,9-bis(3-aminopropyl)-2,4,8,10-tetraoxaspiro[5,5]undecane (hereinafter referred to as ATU) was heated to 45°–55° C. To the melt so obtained, 30.0 g. (0.2 mole) phenylglycidyl ether,

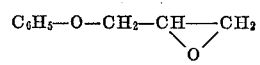

was added drop by drop over a period of two hours, and the mixture was kept at the same temperature for one hour longer. A colorless and transparent, viscous, liquid mixture of the reaction product and of unreacted ATU was obtained. When stored below 5° C. for 24 hours and for three months at room temperature, the mixture did not form a precipitate.

The same procedure was used in preparing other curing agents from diamines and epoxides as listed in Table 1. Cardura E is a commercially produced glycidyl ester of a tertiary fatty acid of the formula

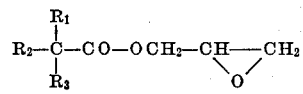

having a molecular weight of 240–250, a boiling point of 135° C., $R_1$, $R_2$, $R_3$ are aliphatic chains, and the total number of carbon atoms in the acid moiety of the ester is 9 to 11. Epon is a registered trademark for various glycidyl ethers of bisphenol A and its polycondensation products, all of which form curing agents with the spiroacetal diamines of this invention and will be described more fully hereinbelow.

TABLE 1

| Curing agent No. | Spiroacetal diamine | Epoxide | Mole ratio diamine/epoxide | Viscosity 20° C., cp., Brookfield |
|---|---|---|---|---|
| 1 | ATU | Phenyl glycidyl ether | 2:1 | 52,000 |
| 2 | ATU | Allyl glycidyl ether | 1:1 | 13,200 |
| 3 | ATU | ....do.... | 2:1 | 4,200 |
| 4 | ATU | n-Butyl glycidyl ether | 1:1 | 7,400 |
| 5 | ATU | ....do.... | 2:1 | 4,400 |
| 6 | ATU | Cardura E | 1:1 | 37,000 |
| 7 | ATU | ....do.... | 2:1 | 8,900 |
| 8 | ATU | (¹) | 2:1 | 20,000 |
| 9 | ATU | Epon 1001 | 2:1 | 10,000 |
| 10 | (²) | Phenyl glycidyl ether | 2:1 | 49,000 |
| 11 | (³) | n-Butyl glycidyl ether | 2:1 | 5,000 |
| 12 | (⁴) | ....do.... | 1:1 | 7,900 |
| 13 | ATU | Propylene oxide | 1:1 | 7,500 |
| 14 | ATU | ....do.... | 2:1 | 15,000 |
| 15 | ATU | Hexylene oxide ⁵ | 1:1 | 14,000 |
| 16 | ATU | ....do.⁵ | 2:1 | 4,200 |
| 17 | ATU | Styrene oxide | 1:1 | 380,000 |
| 18 | ATU | ....do.... | 2:1 | 44,200 |
| 19 | ATU | p-Pentadecylphenyl glycidyl ether | 1.2:1 | 14,500 |
| 20 | ATU | ....do.... | 2.3:1 | 2,300 |

¹ 3,4-epoxy-6-methylcyclohexylmethyl 3,4-epoxy-6-methylcyclohexanecarboxylate.
² 3,9-bis(4-aminobutyl)-2,4,8,10-tetraoxaspiro[5,5]undecane.
³ 3,9-bis(2-aminoethyl)-2,4,8,10-tetraoxaspiro[5,5]undecane.
⁴ 3,9-bis(2-aminoethyl)-3,9-diethyl-2,4,8,10-tetraoxaspiro[5,5]undecane.
⁵ The hexylene oxide employed was a mixture of the terminal and inner epoxides and was reacted with the ATU at 120° C. for three hours.

EXAMPLE 2

The curing agents listed in Table 1 were mixed with Epon 828 in the weight percentage ratios listed in Table 2 (grams curing agent per 100 g. Epon 828), and 50 g. batches of the several mixtures were stored in identical containers in an air-conditioned room at 20°±1° C. and 65% relative humidity. For comparison, two batches of Epon 828 were mixed with conventional, typical polyamine and polyamide curing agents respectively in the ratios recommended. The polyamine was triethylene tetramine (TETA), the polyamide curing agent a commercial product whose precise composition is not known (Tohmide 245), and which has an amine value of 400. The pot lives in minutes and maximum exotherms of the mixtures are listed in Table 2.

TABLE 2

| Curing agent Number | Percent | Pot life, min. | Maximum exotherm, ° C. |
|---|---|---|---|
| 1 | 60 | 40 | 97 |
| 2 | 60 | 65 | 61 |
| 3 | 50 | 65 | 103 |
| 4 | 60 | 55 | 68 |
| 5 | 50 | 55 | 115 |
| 6 | 70 | 70 | 46 |
| 7 | 55 | 70 | 82 |
| 8 | 60 | 85 | 75 |
| 10 | 55 | 50 | 92 |
| 11 | 50 | 55 | 103 |
| 12 | 60 | 65 | 71 |
| 13 | 47 | 85 | 73 |
| 14 | 43 | 85 | 82 |
| 15 | 70 | | 63 |
| 16 | 52 | 120 | 112 |
| 17 | 65 | 60 | 102 |
| 18 | 45 | 60 | 130 |
| 19 | 100 | 50 | 78 |
| 20 | 65 | 50 | 121 |
| TETA | 10 | 50 | 124 |
| Tohmide 245 | 50 | 75 | 39 |

EXAMPLE 3

Resin specimens prepared from the batches described in Example 2 were subjected to heat distortion tests (ASTM D648–56) and flexure tests (ASTM D790–63), and the curing conditions and test results are listed in Table 3, wherein R.T. is room temperature, all other temperatures are in ° C., and HDT is heat distortion temperature. No failure under the available test conditions is indicated by =.

EXAMPLE 4

Test specimens were prepared from 80 g. each of compositions listed in Table 2 by curing the mixtures in cylindrical molds of 70 mm. diameter and 30 mm. depth together with a spring washer of one inch diameter at room temperature for 14 days. They were then tested for thermal shock resistance by up to ten cycles of alternating immersion in boiling water and in ice water for periods of 30 minutes, and inspected. The results are listed in Table 4 in which the ratings have the following meaning:

A—No cracks
B—Slight crack
C—Small crack
D—Considerably cracked
E—Large and numerous cracks
+—Cracked during curing Where more than one line is associated with a curing agent, more than one specimen was tested. No. 7A differed from No. 7 in Table 2 by the use of 70% curing agent (15% excess).

TABLE 4

| Curing agent | Number of cycles | | | | | | | | | |
|---|---|---|---|---|---|---|---|---|---|---|
| | 1 | 2 | 3 | 4 | 5 | 6 | 7 | 8 | 9 | 10 |
| No. 6 | A | A | A | A | A | A | A | A | A | A |
| | A | A | A | A | A | A | A | A | A | A |
| | A | A | A | A | A | A | A | A | A | A |
| No 7 | C | D | D | D | D | D | D | D | D | D |
| | C | D | E | | | | | | | |
| | A | A | B | D | E | | | | | |
| | B | B | B | B | B | B | B | B | B | B |
| No. 7A | A | A | A | A | A | A | A | A | B | B |
| | A | A | A | A | A | A | A | A | A | A |
| No. 4 | C | C | C | C | C | C | C | C | C | C |
| | B | C | C | C | C | C | C | C | C | C |
| No. 5 | A | A | A | A | A | A | A | A | A | A |
| | A | A | A | A | A | A | A | A | A | A |
| TETA | E+ | E | E | E | E | E | E | E | E | E |
| | E | E | E | E | E | E | E | E | E | E |
| Tohmide 245 | E | E | E | E | E | E | E | E | E | E |
| | E | E | E | E | E | E | E | E | E | E |

EXAMPLE 5

Epoxy resins prepared by curing mixtures of the invention described in Example 2 at room temperature for 14 days were machined to test bars 15 mm. x 15 mm. x 45 mm. having a transverse semicylindrical notch of 1 mm. radius in the center of one of the elongated rectangular

TABLE 3

| Curing agent | Curing conditions | HDT | Strain max., mm. | Strength, kg./mm.² | Modulus, kg./mm.² |
|---|---|---|---|---|---|
| No. 1 | Room temperature | 80 | 31.3 | 14.4 | 388 |
| | 3 hours/80° | 75 | 29.2 | 12.2 | 298 |
| No. 2 | Room temperature | 52 | 20.0 | 10.0 | 290 |
| | 3 hours/80° | 55 | = | 10.8 | 311 |
| No. 3 | Room temperature | 75 | = | 11.0 | 290 |
| | 3 hours/80° | 77 | 29.6 | 11.0 | 287 |
| No. 4 | Room temperature | 74 | 33.7 | 11.4 | 292 |
| | 3 hours/80° | 65 | = | 10.7 | 309 |
| No. 5 | Room temperature | 52 | 21.0 | 10.0 | 295 |
| | 3 hours/120° | 75 | = | 11.5 | 313 |
| No. 6 | Room temperature | 58 | 34.2 | 10.5 | 320 |
| | 3 hours/100° | 55 | = | 10.7 | 310 |
| No. 7 | Room temperature | 79 | 28.5 | 11.2 | 290 |
| | 3 hours/80° | 74 | 31.7 | 11.4 | 296 |
| No. 8 | Room temperature | 60 | 25.0 | 10.1 | 250 |
| No. 10 | Room temperature | 75 | 29.5 | 12.0 | 320 |
| No. 11 | Room temperature | 55 | 25.0 | 10.5 | 301 |
| | 3 hours/80° | 70 | 31.1 | 11.0 | 310 |
| No. 12 | Room temperature | 65 | 29.1 | 11.1 | 300 |
| No. 13 | Room temperature | 62 | 22.2 | 12.7 | 379 |
| No. 14 | Room temperature | 87 | 16.2 | 12.4 | 298 |
| No. 15 | Room temperature | 60 | 25.2 | 10.8 | 292 |
| No. 16 | Room temperature | 66 | 17.3 | 11.1 | 295 |
| No. 17 | Room temperature | 68 | 20.5 | 11.2 | 305 |
| No. 18 | Room temperature | 81 | 18.3 | 10.3 | 310 |
| No. 19 | Room temperature | 60 | 25.7 | 11.2 | 301 |
| No. 20 | Room temperature | 75 | 20.8 | 12.1 | 290 |
| TETA | Room temperature | 55 | 4.6 | 9.15 | 388 |
| | 3 hours/100° | 79 | 15.6 | 13.7 | 320 |
| Tohmide 245 | 3 hours/65° | 64 | 20.7 | 9.85 | 242 | faces. The notched specimens were subjected to Sharpy impact resistance tests according to Japanese Industrial

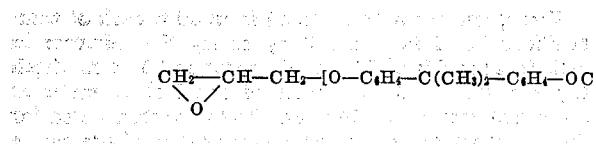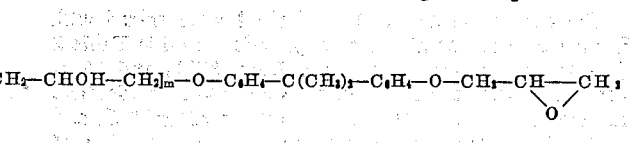

Standard K-6911. Mean values of six tests are listed in Table 5. The capacity of the apparatus used was 15.7 kg.-cm./cm.$^2$, and values of 15.7+ in the table indicate that the specimen did not fail. Comparison tests were run with a mixture prepared from Epon 828 and 9% TETA cured 14 days at room temperature, and with a mixture of Epon 828 with 50% Tohmide 245 cured at 65° C. for three hours.

TABLE 5

| Curing agent: | Impact resistance, kg.-cm./cm.$^2$ |
|---|---|
| No. 6 | 14.4 |
| No. 7 | 15.7+ |
| No. 4 | 14.3 |
| No. 5 | 15.7+ |
| TETA | 4.3 |
| Tohmide | 8.9 |

EXAMPLE 6

The mixtures described in Exmaple 5 were cured in a glass mold at 120° C. for 30 minutes to prepare resin sheets from which tensile test specimens were machined to the specifications of Japanese Industrial Standard K-6911. The specimens were tested for tensile strength and modulus of elasticity in tension at 21° C., R.H. 65%, at a cross-head speed of 5 mm./sec. Mean values in kg./mm.$^2$ of the results obtained with 3-6 specimens are listed in Table 6.

TABLE 6

| Curing agent | Tensile strength | Modulus |
|---|---|---|
| No. 6 | 7.15 | 232 |
| No. 7 | 6.52 | 194 |
| No. 4 | 7.15 | 235 |
| No. 5 | 7.30 | 216 |
| TETA | 5.09 | 273 |
| Tohmide 245 | 6.89 | 237 |

EXAMPLE 7

Epon 828 was mixed with ATU (35%), curing agent No. 1 (60%), No. 2 (60%), No. 3 (50%), TETA (10%) and Tohmide 245 (50%). The several mixtures so prepared were cured as indicated in Table 7 and subjected to flexure tests under the conditions of Example 3. While comparable values for maximum strength and elastic modulus were recorded for the tested resins prepared with curing agents of the invention and ATU alone, the resins cured with the agents of the invention were superior in their values of maximum strain before failure to the specimens cured with ATU alone and to those cured with TETA or Tohmide 245 under comparable conditions.

TABLE 7

| Curing agent | Curing conditions | Maximum strain, mm. |
|---|---|---|
| ATU | Room temperature | 19.3 |
| | 30 minutes/80° | 21.8 |
| No. 1 | Room temperature | 31.3 |
| | 3 hours/80° | 29.7 |
| No. 2 | Room temperature | 20.0 |
| | 3 hours/80° | = |
| No. 3 | Room temperature | = |
| | 3 hours/80° | 29.6 |
| TETA | Room temperature | 4.6 |
| | 3 hours/100° | 15.6 |
| Tohmide 245 | 3 hours/65° | 20.7 |

Epon 828 was chosen in all preceding examples as the resin intermediate for demonstrating the superior mechanical properties of epoxy resins cured by means of the curing agents of the invention in order to facilitate correlation of the several sets of data. However, closely analogous results were obtained with all other commercially available epoxy resin intermediates which we have been able to test. Epon 828 is merely representative of the glycidyl ethers of bisphenol A, glycidyl ethers of the poly-condensation products of bisphenol A of the formula and mixtures thereof, which are useful both as reaction partners for the afore-mentioned spiroacetal diamines in preparing the curing agents, and as resin intermediates which may be hardened by means of the curing agents. In the formula, $m$ is zero or an integer.

Epon 828 is a liquid mixture of such ethers or ether polycondensation products which has an average molecular weight of approximately 380, a corresponding epoxy equivalent of 185 to 192 g. per gram equivalent of epoxide, and an esterification value of about 85. It is prepared by condensation of bisphenol A with epichlorohydrin as generally described in British Pat. No. 974,139. The commercially available product has a color of 8 max. (Gardner) and a viscosity of 135 to 160 poises.

Epon 1001, referred to in Table 1, has an average molecular weight of approximately 900 with a corresponding epoxy equivalent of 425-550, and an esterification value of 145. It is a solid melting at 65°-75° C., a Gardner color of 4 max., and a viscosity of D-G on the Gardner-Holdt scale as determined in a 40% solution of the material in diethyleneglycol monobutyl ether at 25° C.

Epon 834 is a liquid which is intermediate in molecular weight (approximately 480), epoxy equivalent, esterification value and viscosity between the two epoxides described above, and has been used successfully as a reaction partner for the spiroacetal diamines and as a resin intermediate according to this invention.

The epoxides listed in Table 1 are merely representative of those which form viscous, liquid condensation products with the spiroacetal diamines described above. Analogous viscous mixtures of condensation products were obtained under the reaction conditions of Example 1 with the epoxides enumerated in Table 8 below, and tests indicate that they are as effective in curing epoxy resin intermediates at room temperature as the curing agents more fully described above. No viscous, liquid condensation products of one of the spiroacetal diamines defined above and of an epoxide have been found which would not show the desired curing effect. In the table, G is glycidyl

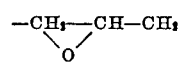

and $n$ is an integer greater than 3.

TABLE 8

| Compound | Structure |
|---|---|
| n-Propyl glycidyl ether | $C_3H_7$—OG |
| Diglycidyl ether | G—O—G |
| Diethyleneglycol diglycidyl ether | G—O—$(CH_2CH_2$—O$)_2$—G |
| Triethyleneglycol diglycidyl ether | G—O—$(CH_2CH_2$—O$)_3$—G |
| Butanediol diglycidyl ether | GO—$(CH_2)_4$—OG |
| Glycerine diglycidyl ether | GO—$CH_2$—CHOH—$CH_2$—OG |
| Polyethyleneglycol diglycidyl ether | GO—$(CH_2CH_2O)_n$—OG |
| Cresyl glycidyl ether | $CH_3$—$C_6H_4$—OG |
| p-Butylphenyl glycidyl ether | $C_4H_9$—$C_6H_4$—OG |
| Diglycidyl ether of resorcinol | GO—$C_6H_4$—OG |
| m-Glycidylphenyl glycidyl ether | G—$C_6H_4$—OG |
| Diglycidyl ether of diphenolic acid | G—O—$C_6H_4$—C($CH_3$)—$C_6H_4$—OG<br>                \|<br>                $CH_2CH_2COOH$ |
| Polyglycidyl ether of novolac resin | G—O—$C_6H_4$—$CH_2$—(GO—$C_6H_3$—$CH_2$)$_n$—$C_6H_4$—OG |
| Diglycidyl ether of hydroquinone | GO—$C_6H_4$—OG |
| Diglycidyl ether of catechol | GO—$C_6H_4$—OG |
| Triglycidyl ether of phloroglucinol | (GO)$_3$—$C_6H_3$ |
| Glycidyl methacrylate | $CH_2$=C($CH_3$)—COOG |
| Glycidyl esters of polymeric fatty acid (R=polymeric fatty acid radical) | G—OCO—R—COO—G |
| Glycidyl esters of adipic and sebacic acid ($n'$=4 or 6) | G—OCO—$(CH_2)_{n'}$—COOG |
| Glycidyl ester of phenolphthalein | G—OCO—$C_6H_4$—C($C_7H_4O_2$)—$C_6H_4$—COO—G |
| Octylene oxide | $C_6H_{11}$—CH——CHCH$_3$<br>          \\O/ |
| Glycidyl ether ester of 2,4,6-tribromo-3-hydroxybenzoic acid | G—OCO—$C_6HBr_3$—OG |
| Ethylene oxide | $CH_2$—$CH_2$<br>   \\O/ |
| Butadiene dioxide | $CH_2$—CHCH——$CH_2$<br> \\O/    \\O/ |
| Dimethylpentadiene dioxide | $CH_2$—C($CH_3$)$CH_2$C($CH_3$)——$CH_2$<br>   \\O/             \\O/ |
| Dioxide of 4,6-diallyl-m-xylene | $CH_2$—CHCH$_2$—$C_6H_2(CH_3)_2$—$CH_2$—CH——$CH_2$<br> \\O/                                  \\O/ |
| Divinylbenzene dioxide | $CH_2$—CH—$C_6H_4$—CH——$CH_2$<br> \\O/                  \\O/ |
| Vinylcyclohexane monoxide | (cyclohexane ring with epoxide and CH=CH$_2$ substituent) |
| Vinylcyclohexane dioxide | (cyclohexane ring with two epoxide groups) |
| α-Pinene oxide | (pinene structure with epoxide) |
| Dipentene monoxide | (dipentene structure with one epoxide) |
| Limonene dioxide | (limonene structure with two epoxides) |
| Epoxidized soybean oil | |
| Epoxidized tallow oil | |
| Epoxidized lemon oil | |
| Epoxidized lanoline oil | |

What is claimed is:

1. A liquid viscous at 20° C. and capable of curing a liquid epoxy resin intermediate at room temperature, said viscous liquid essentially consisting of the product of condensation at 20° to 150° C. of a spiroacetal diamine of the formula

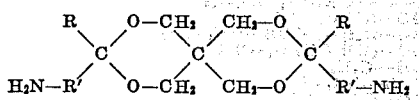

with an epoxide in a ratio of 0.25 mole to 10 moles of said spiroacetal diamine per oxirane group equivalent of said epoxide, in said formula R being hydrogen, methyl, or ethyl, and R' being straight or branched-chain alkyl having 1 to 6 carbon atoms.

2. A liquid as set forth in claim 1 having a viscosity of 1000 to 500,000 centipoise at 20±1° C. as determined by means of a Brookfield type viscosimeter.

3. A liquid as set forth in claim 2, wherein said epoxide is a member of the group consisting of phenyl glycidyl ether, allyl glycidyl ether, n-butyl glycidyl ether, glycidyl ester of a tertiary fatty acid having 9 to 11 carbon atoms, 3,4-epoxy - 6 - methylcyclohexylmethyl 3,4-epoxy-6-methylcyclohexanecarboxylate, diglycidyl ether from epichlorohydrin and bisphenol A, propylene oxide, hexylene oxide, styrene oxide, p-pentadecylphenyl glycidyl ether, n-propyl glycidyl ether, diglycidyl ether, diethyleneglycol diglycidyl ether, triethyleneglycol diglycidyl ether, butanediol diglycidyl ether, glycerol diglycidyl ether, polyethylene glycol diglycidyl ether, cresyl glycidyl ether, p-butylphenyl glycidyl ether, diglycidyl ether of resorcinol, m-glycidylphenyl glycidyl ether, diglycidyl ether of diphenolic acid, polyglycidyl ether of novolac resin, diglycidyl ether of hydroquinone, diglycidyl ether of catechol, triglycidyl ether of phloroglucinol, glycidyl methacrylate, glycidyl ester of polymeric fatty acid, glycidyl ester of adipic acid, glycidyl ester of sebacic acid, glycidyl ester of phenolphthalein, octylene oxide, glycidyl ether ester of 2,4,6-tribromo-3-hydroxybenzoic acid, ethylene oxide, butadiene dioxide, dimethylpentadiene dioxide, dioxide of 4,6-diallyl-m-xylene, divinylbenzene dioxide, vinylcyclohexane monoxide, vinylcyclohexane dioxide, α-pinene oxide, dipentene monoxide, limonene dioxide, epoxidized soybean oil, epoxidized tallow oil, epoxidized lemon oil, and epoxidized lanoline oil.

4. A liquid as set forth in claim 2, wherein said epoxide is a glycidyl ether of bisphenol A.

5. A liquid as set forth in claim 2, wherein said epoxide is an alkylene oxide having 3 to 8 carbon atoms.

6. A liquid as set forth in claim 2, wherein said epoxide is a compound of the formula

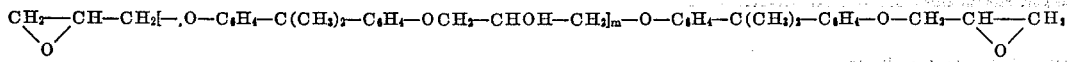

wherein $m$ is zero or an integer.

References Cited

UNITED STATES PATENTS 3,128,255   4/1964   McGary et al. _____ 260—2

WILLIAM H. SHORT, Primary Examiner

T. E. PERTILLA, Assistant Examiner

U.S. Cl. X.R.

260—2 BP, 2 N, 18 PF, 47 EN, 59

UNITED STATES PATENT OFFICE
CERTIFICATE OF CORRECTION

Patent No. 3,773,790     Dated November 20, 1973

Inventor(s) IPPEI YOSHIMURA ET AL

It is certified that error appears in the above-identified patent and that said Letters Patent are hereby corrected as shown below:

In the heading, after line 12, insert --

Claims priority, application Japan, June 26, 1965, 38175/65; February 9, 1966, 7496/66 --

Signed and sealed this 9th day of April 1974.

(SEAL)
Attest:

EDWARD M. FLETCHER, JR.
Attesting Officer

C. MARSHALL DANN
Commissioner of Patents